Sept. 9, 1969 TATSUYA INAMIYA ET AL 3,466,390

PROTECTIVE DEVICE FOR TRANSISTOR TELEVISIONS

Filed March 18, 1965 2 Sheets-Sheet 1

Tatsuya Inamiya
Goro Suzuki
Masami Tanikawa
Takao Matsui
INVENTOR

BY George B. Oujevolk
Attorney

PROTECTIVE DEVICE FOR TRANSISTOR TELEVISIONS

Filed March 18, 1965 2 Sheets-Sheet 2

INVENTOR.

BY

United States Patent Office 3,466,390

Patented Sept. 9, 1969

3,466,390

PROTECTIVE DEVICE FOR TRANSISTOR TELEVISIONS

Tatsuya Inamiya and Goro Suzuki, Tokyo, Masaru Tanikawa, Fujisawa-shi, and Takao Matsui, Yokohama-shi, Japan, assignors to Tokyo Shibaura Electric Co., Ltd., Kawasaki-shi, Japan, a corporation of Japan Filed Mar. 18, 1965, Ser. No. 440,817
Claims priority, application Japan, Mar. 24, 1964, 39/16,076
Int. Cl. H04n *3/16, 5/44*
U.S. Cl. 178—7.5 1 Claim

ABSTRACT OF THE DISCLOSURE

A protective device for transistorized television receivers comprising an image amplifying output transistor to amplify image signals, a load circuit connected to the collector electrode of this transistor, a cathode ray tube connected to the load circuit and a diode connected in parallel with the load circuit. The diode is normally biased so that it will exhibit a high impedance to the image signals.

This invention relates to a protective device for transistor televisions which can prevent rupture of image amplifying output transistors of transistor television receivers without affecting the ability of their image amplifying.

Since a high voltage of the order of from 10,000 to 15,000 volts is usually impressed upon the cathode ray tube of television receivers there is a danger of producing an electric arc discharge between electrodes mounted in the cathode ray tube, for example, between the anode and the focusing electrode and between the anode and the second grid electrode. As a result when an arc discharge is struck between the anode and other electrode a voltage of the order of several thousands will be induced at said other electrode thus threatening the insulation of circuit elements and wiring leads connected to said other electrode.

When compared with electron tubes, semiconductor elements such as transistors can not well withstand to surge voltage so that they are greatly affected by the induced voltage due to discharge and are liable to be damaged thereby.

In television receivers utilizing vacuum tube circuits it has been the practice to connect a discharge gap or a by-pass condenser having high breakdown voltage between the ground and the focusing electrode and the second grid electrode of the cathode ray tube in order to prevent any high voltage from producing in the vacuum tube circuit whereby to protect various circuit elements against such a surge voltage.

While such a protective device is sufficiently effective for television receivers utilizing electron tubes, it is not effective to prevent damage of output transistors adapted to amplify image signals because, as pointed out above, transistors do not withstand surge voltages as well as tubes.

In television receivers the image signals are usually applied to the cathode electrode of the cathode ray tube and even in such an arrangement a positive or negative voltage of the order of from several hundreds to one thousand volts is often generated at the cathode electrode due to an electric discharge in the cathode ray tube thus causing damage to the output transistors for amplifying image signals. A discharge gap which is connected to the cathode circuit of a cathode ray tube in the same manner as above described is not effective to positively protect transistors against rupture because of the inaccurate operation of the discharge gap, and a by-pass condenser connected to the cathode electrode of the cathode ray tube is also impractical because image signals are also by-passed through the condenser.

Accordingly it is an object of this invention to provide a novel protective device for transistor televisions which can positively prevent rupture of output transistor for amplifying image signals caused by a dangerous surge voltage created by an electric discharge occurring in the cathode ray tube.

A further object of this invention is to prolong the effective life of transistor televisions.

A still further object is to reduce transistor television faults thereby making possible their use with the least trouble.

According to one form of this invention a first diode exhibiting a high impedance to image signals and normally reversely biased with respect to DC voltage is connected across a load circuit which is connected to the collector electrode of an output transistor adapted to amplify image signals and across the base and emitter electrodes of said transistor is connected to a second diode with a polarity to exhibit a high impedance to the current flowing between said base and emitter electrodes whereby to protect said output transistor against a surge voltage caused by an electric discharge occurring in the cathode ray tube by absorbing the surge voltage by by-passing the surge current through said first and second diodes.

In a modification of this invention a discharge tube having a discharge starting voltage so selected that the discharge tube is not started or triggered by the DC operating voltage of the cathode ray tube and by the operating image signal voltage is connected across the load circuit which is connected to the collector electrode of the output transistor for amplifying the image signals whereby to absorb the surge voltage caused by the electric discharge occurring in the cathode ray tube by by-passing the surge current through said discharge tube, thus effectively preventing rupture of said output transistor.

The invention can be more fully understood from the following detailed description, reference should be had to the accompanying drawings, in which.

Figures 1, 2, 3:
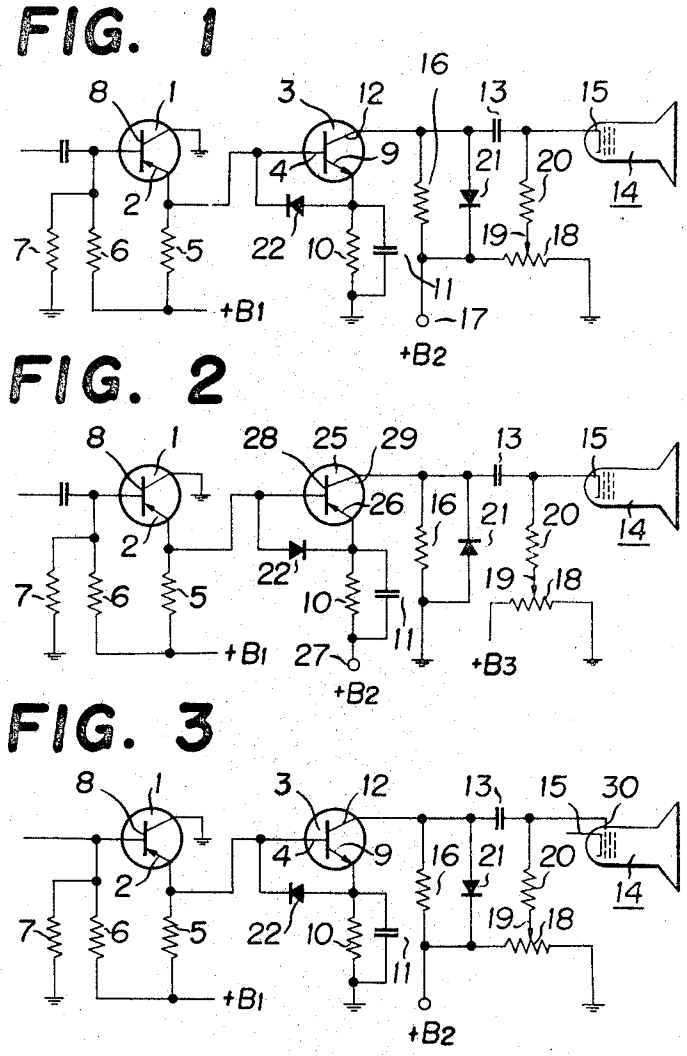
FIG. 1 is a circuit diagram of one example of the protective device for transistor televisions, which is constructed in accordance with the principle of this invention.
FIG. 2 shows a circuit diagram of a modified protective device for transistor televisions.
FIG. 3 shows still further modification of this invention.

Referring now to FIG. 1 of the accompanying drawing the emitter electrode 2 of a PNP-type transistor 1 for amplifying image signals is connected to the base electrode 4 of an NPN-type output transistor 3 adapted to amplify the image signals. The emitter electrode 2 of said amplifier transistor 1 is connected to an electric source $+B_1$ through a resistor 5, a fraction of the voltage of said source $+B_1$ being also supplied to the base electrode 8 of the transistor 1 through a voltage divider comprising resistors 6 and 7. The emitter electrode 9 of said output transistor 3 is grounded through a resistor 10 shunted by a condenser 11, while the collector electrode 12 of the output transistor 3 is coupled to the cathode electrode 15 of a cathode ray tube 14 via a coupling condenser 13. A source $+B_2$ is connected to the emitter electrode 12 through a load resistor 16 and a terminal 17 which is grounded through a brightness adjusting potentiometer 18 having a slider 19 connected to the cathode electrode 15 of the cathode ray tube 14 via a resistor 20. The load resistor is shunted by a first diode 21 having a polarity to exhibit a high impedance to the potential of the source $+B_2$. Further, across the base and emitter electrodes 4 and 9 of the output transistor 3 is connected a second diode 22 of the polarity to exhibit a high impedance to image signals coming from the amplifying transistor 1 whereby to constitute the protective device for the transistor television.

With the arrangement described above, aftr being amplified by the output transistor 3, the image signals are supplied to the cathode ray tube 14. In the event of a discharge within the cathode ray tube which induces a surge voltage in the cathode electrode 15, since the image amplifying output transistor 3 is of the NPN type, in the case of a positive surge voltage, this surge voltage will be superposed upon the load circuit to produce a bias voltage acting in the direction opposite to the direction of conduction between the collector electrode 12 and the base electrode 4 of the transistor 3. However, said surge current due to internal discharge will be bypassed and hence adsorbed by the first diode connected to the collector electrode 12, thus effectively preventing breakdown between the collector and base electrodes 12 and 4.

Where no surge voltage is induced in the cathode electrode 15, the first diode is normally biassed in the reverse direction so that its impedance is extremely high. Further if a diode having a small coupling capacitance is used as the diode 21 its effect upon the circuit frequency characteristic would be very small so that there is no fear of disturbing the image.

In case where a negative surge voltage is induced the direction of conduction between the collector electrode 12 and the base electrode 4 will be biassed in the forward direction whereas that between the base electrode 4 and the emitter electrode 9 in the reverse direction thus principally causing breakdown between the base electrode 4 and the emitter electrode 9. However the second diode 22 will by-pass the negative surge current tending to flow through the base electrode 4 and the emitter electrode 9 via the collector electrode 12 and the base electrode 4, whereby to absorb the surge voltage, thus protecting the transistor 3 from rupturing. In this case, too, the diode 22 is reversely biassed with respect to the image signals to exhibit a high impedance. Since the impedance between base and emitter electrodes is of the order of several hundred ohms it will scarcely affect the frequency characteristic.

Of course the first and second diodes 21 and 22 should be capable of withstanding to any positive and negative surge voltages that may be expected and also to surge currents by-passed thereby. While in the above embodiment the same source as that utilized for brightness adjustment was used for reversely biassing the first diode 21 it will be obvious that separate sources may be provided for theses purposes.

Further the diode 21 may be connected to the signal transmitting circuit extending between the collector electrode 12 of the transistor 3 and the cathode elecrode 15 of the cathode ray tube 14 on either side of the coupling condenser 13 provided that the diode is reversely biassed with reference to the DC potential and the image signals.

FIG. 2 illustrates a modified embodiment of this invention which is identical to FIG. 1 except that the NPN-type image amplifying output transistor 3 of FIG. 1 is replaced by a PNP-type transistor 25. In this case, the emitter electrode 26 of the PNP-type image amplifying output transistor 25 is connected to the source $+B_2$ via a resistor 10 and a condenser 11 which are connected in parallel, and a terminal 27. The first diode 21 is connected in parallel with the load resistor 16 but with the opposite polarity as the diode 21 shown in the first embodiment. Similarly, the polarity of the second diode 22 connected between the emitter electrode 26 and the base electrode 28 of the transistor 25 is reversed. Further an independent brightness adjusting source $+B_3$ is connected to one end of the potentiometer 18. In both embodiments the same components are designated by the same reference numerals.

Since the type of the output transistor is changed from NPN to PNP, the embodiment shown in FIG. 1. More particularly for a negative voltage induced in the cathode electrode 15 of the cathode ray tube 14 and superposed upon the load circuit, the direction of conduction between the collector electrode 29 and the base electrode 28 of the transistor 25 will be biassed in the reverse direction, whereas for a positive surge voltage the direction of conduction between the collector electrode 29 and the base electrode 28 will be biassed in the forward direction and that between the base electrode 28 and the emitter electrode 26 will be biassed in the reverse direction. As the result the first diode 21 acts to by-pass the negative surge current coming from the cathode 15 whereby to absorb the surge voltage and the second diodes 22 acts to by-pass the positive surge current tending to flow through the collector electrode 29 and the base electrode 28 of the transistor 25 whereby to absorb the surge voltage. Thus in the same manner as has been described in connection with the first embodiment the output transistor 25 is well protected against surge voltages created by the discharge occurring in the cathode ray tube.

Although in the above illustrated embodiments, the operating image signals coming from the output transistors are applied to the cathode electrode of a cathode ray tube, the image signals may be impressed upon a grid electrode of the cathode ray tube as shown in FIG. 3.

Thus, in FIG. 3 the collector electrode 12 of an output transistor 3 is coupled to a grid electrode 30 of a cathode ray tube 14 via a coupling condenser 15. Other circuit arrangement is identical to that shown in FIG. 1 and corresponding components are designated by the same numerals as in FIG. 1 so that description thereof is believed unnecessary.

In any of the above described embodiments, if desired, the first or the second diode may be omitted with comparative protective ability.

Figure 4:
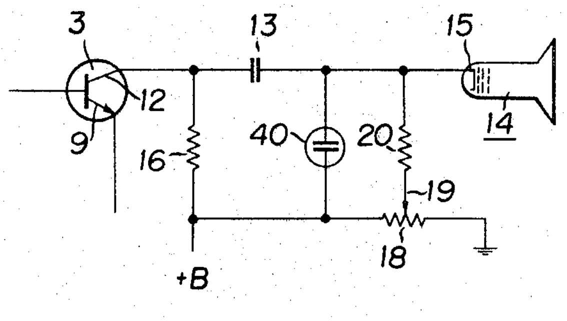
FIG. 4 shows yet another modification of this invention.
Figure 5:
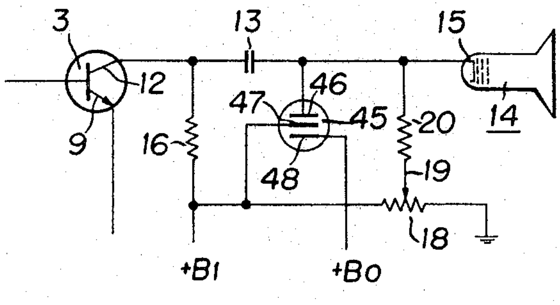
FIG. 5 is a circuit diagram of further modification of this invention.

FIGS. 4 and 5 illustrate such modified embodiments wherein the first and second diodes are substituted by a single discharge tube.

In FIG. 4 the collector electrode 12 of an NPN-type image amplifying output transistor 3 is connected to the cathode electrode 15 of a cathode ray tube 14 through a coupling condenser. The collector electrode 12 is also connected to a source +B through a load resistor 16 and the source +B is grounded through a potentiometer 18 for brightness adjustment having a slider 19 which is connected to the cathode electrode 15 of the cathode ray tube 14 through a resistor 20.

A constant voltage discharge tube 40 is connected across the load resistor 20 through the coupling condenser 13. In this case it is required to select such discharge tube 40 as having a breakdown voltage of the order of about 150 volts which is outside the range of the DC operating voltage or a voltage range within which the brightness is varied, and is larger than the operating image signal voltage. It is further desirable to use a discharge tube 40 having as small as possible electrostatic capacitance, say for example, of the order of 2 pf.

With this protective arrangement upon occurrence of a surge voltage in the cathode electrode 15 of, the cathode ray tube 14 due to discharge inside thereof, the discharge tube will discharge when its breakdown voltage is exceeded. Consequently the internal impedance of the discharge tube 40 will be greatly reduced to by-pass the surge current and hence to absorb the surge voltage. Thus the output transistor 3 is effectively protected against high surge voltage induced in the cathode electrode 15 of the cathode ray tube. In this case the discharge tube 40 operates for both positive and negative surge voltages.

As has been pointed out if the electrostatic capacitance of the discharge tube 40 is sufficiently small the effect upon the frequency characteristic of the image signal could be neglected. It will be clear that it is necessary to make as small as possible the response time of the discharge tube 40.

FIG. 5 illustrates a still further embodiment of this invention wherein a trigger discharge tube is employed as the protective discharge tube so as to further decrease the response time to the surge voltage.

Components of the circuit shown in FIG. 5 corresponding to those of FIG. 4 are designated by the same reference numerals and the description thereof is omitted. The first electrode 46 of a trigger discharge tube 45 is connected to the cathode electrode of a cathode ray tube 14, the second electrode 47 of the discharge tube to the source $+B_1$ which is corresponding to the source $+B_1$ in FIG. 4 and the third electrode 48 to a source $+B_0$.

In this case a voltage close to the breakdown voltage is normally applied across the second and third electrodes 47 and 48 from the sources $+B_1$ and $+B_0$ to maintain the interior of the discharge tube 45 in an ionized state. Due to this preionization the trigger discharge tube 45 can start at the instant of application to its first electrode 46 of the surge voltage coming from the cathode ray tube. In other words the protective device provides better protection for the output transistor 3 without any time lag.

While in FIGS. 4 and 5 the discharge tubes are shown connected between the coupling condenser 13 and the cathode electrode 15 of the cathode ray tube 14 it is also possible to connect the discharge tube between the coupling condenser 13 and the output transistor 3.

To fully protect the output transistor 3 a diode may be connected across the emitter electrode and the base electrode of the transistor to by-pass the surge current around theb ase and emitt erelectrodes thereby to absorb the surge voltage in the same manner as in the first, second and third embodiments.

Further in case when the operating image signals from the output transistor is coupled to a grid electrode of a cathode ray tube it is possible to provide sufficient protection for the output transistor by connecting the discharge tube to the signal transmitting circuit extending between the output transistor and the grid electrode of the cathode ray tube.

Thus this invention provides an effective protective device for the image amplifying output transistor which can well protect the transistor against the surge voltage due to discharge occurring in the cathode ray tube thus greatly prolonging the useful life of transistor television receivers, which are very beneficial to many users of the receiver.

While the invention has been explained by describing particular embodiments thereof, it will be apparent that improvements and modifications may be made without departing from the scope of the invention as defined in the appended claim.

What is claimed is:

1. A protective device for transistor television comprising a first transistor (1) supplying an image signal to the base (28) of a transistor (25) said transistor also having an emitter electrode (26) and a collector electrode (29) joined to said base (28), said emitter electrode (26) having a resistor (10) and lead for connection to a current source ($+B_2$), a cathode ray tube (14) including a cathode electrode (15) connected to said collector electrode (29) by a coupling condenser (13) and a junction, a load resistor (16) connecting said junction to ground; a first diode (21), shunting said load resistor, disposed so that its polarity offers a high impedance to signals from said cathode ray tube (14), and, a second diode (22) between said base electrode (28) and emitter electrode (26), in series with said emitter electrode lead, disposed to offer a high impedance to said current source ($+B_2$), with its polarity opposite to the polarity of said base (28) joined to said collector electrode (29).

References Cited

UNITED STATES PATENTS

| | | | |
|---|---|---|---|
| 3,061,671 | 10/1962 | Waller | 178—7.1 |
| 3,159,751 | 12/1964 | Bogdan et al. | |
| 3,204,027 | 8/1965 | Clements. | |
| 3,249,693 | 5/1966 | Suhrmann. | |
| 3,262,016 | 7/1966 | Martin. | |

ROBERT SEGAL, Primary Examiner

U.S. Cl. X.R.

307—202; 315—30; 330—11